(12) United States Patent
Sun et al.

(10) Patent No.: US 12,247,908 B2
(45) Date of Patent: Mar. 11, 2025

(54) DETECTION DEVICE AND DETECTION METHOD FOR DISTINGUISHING TYPES OF PARTICLES IN AQUEOUS SOLUTION

(71) Applicant: NATIONAL TAIWAN UNIVERSITY, Taipei (TW)

(72) Inventors: Chi-Kuang Sun, Taipei (TW); Peng-Jui Wang, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 282 days.

(21) Appl. No.: 17/830,294

(22) Filed: Jun. 1, 2022

(65) Prior Publication Data

US 2023/0228666 A1 Jul. 20, 2023

(30) Foreign Application Priority Data

Jan. 18, 2022 (TW) .................................. 111101914

(51) Int. Cl.
*G01N 15/10* (2024.01)
(52) U.S. Cl.
CPC .................................... *G01N 15/10* (2013.01)
(58) Field of Classification Search
CPC ...... G01N 15/10; G01N 15/01; G01N 15/075; G01N 22/00; G01N 2015/0687; G01N 15/06
USPC .... 73/52, 61.41, 61.61, 61.59, 61.71, 64.56, 73/865.5, 865.8; 250/440.11, 250/339.01–339.02, 341.8, 357.1, 250/370.01–370.13, 387, 388, 428
See application file for complete search history.

(56) References Cited

U.S. PATENT DOCUMENTS

| | | | |
|---|---|---|---|
| 9,939,418 B2 | 4/2018 | Eriksson et al. | |
| 2003/0138823 A1* | 7/2003 | Brock | G01N 33/6851 435/6.11 |
| 2003/0194709 A1 | 10/2003 | Yang | |
| 2009/0237067 A1 | 9/2009 | Sun et al. | |

FOREIGN PATENT DOCUMENTS

| | | | | |
|---|---|---|---|---|
| CA | 2906268 C | * | 4/2020 | ............. G01N 22/00 |
| CN | 108088858 A | | 5/2018 | |
| CN | 109959668 A | | 7/2019 | |
| TW | 200938627 A | | 9/2009 | |

* cited by examiner

*Primary Examiner* — Robert R Raevis
(74) *Attorney, Agent, or Firm* — Li & Cai Intellectual Property Office (57) ABSTRACT

A detection device and a detection method for distinguishing types of particles in an aqueous solution are provided. The detection device includes a detection chip, a signal source and a processing device. The detection chip includes a substrate, a coplanar waveguide transmission line and a super-hydrophobic film mask. When a to-be-detected aqueous solution that contains to-be-detected particles is provided on the detection chip, the super-hydrophobic film mask of the detection chip can confine the to-be-detected aqueous solution in a detection area. The processing device controls the signal source to provide detection microwave signals with different detection frequencies, simultaneously measures a first output signal and a second output signal at the different detection frequencies to generate a to-be-detected absorption spectrum, and compares the to-be-detected absorption spectrum with historical absorption spectra, so as to determine types of the to-be-detected particles.

20 Claims, 9 Drawing Sheets

DETECTION DEVICE AND DETECTION METHOD FOR DISTINGUISHING TYPES OF PARTICLES IN AQUEOUS SOLUTION

CROSS-REFERENCE TO RELATED PATENT APPLICATION

This application claims the benefit of priority to Taiwan Patent Application No. 111101914, filed on Jan. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection device and a detection method, and more particularly to a detection device and a detection method for distinguishing types of particles in an aqueous solution.

BACKGROUND OF THE DISCLOSURE

The phenomenon of microwave resonant absorption (MRA) is known to be expressed in varying degrees for substances with simple geometry structures and different compositions whose charges are spatially separated.

For suspended particles composed of viruses, most virus cores are negatively charged due to the presence of phosphate groups in the genome. In contrast, amino acids of viral capsids or envelopes can cause complex charge distributions on the surface of the viruses. Such core-shell charge separation leads to a dipolar coupling between electromagnetic waves and confined acoustic vibrations. When charges are moved by the confined acoustic vibration such that their dipole moments are changed, the MRA phenomenon occurs in the viruses.

Generally, in order to determine types of the suspended particles composed of viruses (e.g., coronavirus), rapid test kits or real-time quantitative polymerase chain reaction (qPCR) techniques are usually used for detection of samples. However, the qPCR techniques are time-consuming, labor-intensive, and prone to false positives, and the rapid test kits have low accuracy and are prone to false negatives. In addition, neither the qPCR techniques nor the rapid test kits can be used repeatedly, thereby resulting in increased costs.

SUMMARY OF THE DISCLOSURE

In response to the above-referenced technical inadequacies, the present disclosure provides a detection device and a detection method for distinguishing types of particles in an aqueous solution.

In one aspect, the present disclosure provides a detection device for distinguishing types of particles in an aqueous solution, and the detection device includes a detection chip, a signal source, and a processing device. The detection chip includes a substrate, a coplanar waveguide transmission line and a super-hydrophobic film mask. The substrate has a detection area and a non-detection area arranged around the detection area. The coplanar waveguide transmission line is disposed on the substrate and across the detection area and the non-detection area. The coplanar waveguide transmission line includes a first ground line, a second ground line and a signal line. The first ground line extends along a first direction. The second ground line extends along the first direction and is parallel to the first ground line. The signal line extends along the first direction and is disposed between the first ground line and the second ground line along a second direction that is perpendicular to the first direction. The signal line has a first end and a second end. The signal line, the first ground line and the second ground line are coplanar, a first gap is provided between the signal line and the first ground line, and a second gap is provided between the signal line and the second ground line. The super-hydrophobic film mask is disposed on the coplanar waveguide transmission line and the substrate, so as to cover the non-detection area without covering the detection area. The signal source is electrically connected to the first end of the signal line, and the signal source is configured to provide a detection microwave signal with a detection frequency to the signal line. The processing device is electrically connected to the first end, the second end and the signal source. The processing device is configured to control the signal source to provide the detection microwave signal, and receive a first output signal of the first end and a second output signal of the second end. In response to a to-be-detected aqueous solution with to-be-detected particles being provided on the detection wafer, the super-hydrophobic film mask is used to confine the aqueous solution to be tested in the detection area, and the processing device is configured to control the signal source, so as to provide the detection microwave signal with different ones of the detection frequency, and the processing device is configured to simultaneously measure the first output signal and the second output signal at the different ones of the detection frequency to generate a to-be-detected absorption spectrum. In response to the processing device generating the to-be-detected absorption spectrum, the processing device is further configured to compare the to-be-detected absorption spectrum with a plurality of historical absorption spectra stored in a memory, so as to determine types of the to-be-detected particles.

In some embodiments, the detection area is a rectangle having a first length in the first direction and a first width in the second direction.

In some embodiments, in response to the signal source providing the detection microwave signal to the first end, a first electric field is formed between the signal line and the first ground line, a second electric field is formed between the signal line and the second ground line, and the first width is related to a maximum electric field intensity of the first electric field or the second electric field.

In some embodiments, the super-hydrophobic film mask has a first thickness, and the first thickness ranges from 5 nm to 15 nm.

In some embodiments, the super-hydrophobic film mask is non-conductive and has a first permittivity, and the first permittivity is within a predetermined range based on a permittivity of air.

In some embodiments, the first permittivity is less than 1.4.

In some embodiments, the super-hydrophobic film mask is a hydrophobic self-assembled monolayer film mask.

In some embodiments, the hydrophobic self-assembled monolayer film mask is made of Octadecyltrichlorosilane (OTS).

In some embodiments, the hydrophobic self-assembled monolayer film mask is made of fluorocarbon.

In some embodiments, the signal line is a microstrip line, and has a second width in the second direction, and the second width ranges from 1.8 to 2.4 mm.

In some embodiments, the first gap and the second gap are equal to each other, and the first gap and the second gap each have a third width ranging from 0.45 mm to 0.65 mm.

In another aspect, the present disclosure provides a detection method for distinguishing types of particles in an aqueous solution. The detection method includes: providing a to-be-detected aqueous solution that contains to-be-detected particles on a detection chip, in which the detection chip includes a substrate, a coplanar waveguide transmission line and a super-hydrophobic film mask. The substrate has a detection area and a non-detection area arranged around the detection area. The coplanar waveguide transmission line is disposed on the substrate and across the detection area and the non-detection area, and the coplanar waveguide transmission line includes a first ground line, a second ground line and a signal line. The first ground line extends along a first direction. The second ground line extends along the first direction and is parallel to the first ground line. The signal line extends along the first direction and is disposed between the first ground line and the second ground line along a second direction that is perpendicular to the first direction. The signal line has a first end and a second end. The signal line, the first ground line and the second ground line are coplanar, a first gap is provided between the signal line and the first ground line, and a second gap is provided between the signal line and the second ground line. The super-hydrophobic film mask is disposed on the coplanar waveguide transmission line and the substrate, so as to cover the non-detection area without covering the detection area. The detection method further includes: confining the to-be-detected aqueous solution in the detection area by the super-hydrophobic film mask; configuring a processing device to control a signal source to provide a detection microwave signal with a detection frequency to the signal line; configuring the processing device to control the signal source to provide the detection microwave signal with different ones of the detection frequency, and to receive a first output signal of the first end and a second output signal of the second end; configuring the processing device to measure the first output signal and the second output signal at the different ones of the detection frequency, so as to generate a to-be-detected absorption spectrum; and configuring the processing device to compare the to-be-detected absorption spectrum with a plurality of historical absorption spectra stored in a memory, so as to determine types of the to-be-detected particles.

Therefore, in the detection device and the detection method for distinguishing types of particles in an aqueous solution provided by the present disclosure, the detection chip with a coplanar waveguide is utilized, such that significant energy coupling and transfer occur between outward-extended microwave electric fields and the to-be-detected particles in the to-be-detected aqueous solution. In this way, the microwave absorption spectrum can be directly measured.

In addition, the self-assembled super-hydrophobic film mask on the detection chip can effectively confine the to-be-detected aqueous solution to a specific area. Therefore, except for microwave absorption generated by the particles, no additional measurement difference is produced between a control group and an experimental group. Furthermore, since a refractive index of the self-assembled super-hydrophobic film mask is similar to that of air, and the self-assembled super-hydrophobic film mask is a non-conductor and has a thickness that is much smaller than a microwave wavelength, a bandwidth and an impedance of the detection chip will not be affected.

Moreover, the microwave absorption spectrum of the particles in the aqueous solution can be obtained within a negligible time (<1 sec) after the aqueous solution is dropped onto the detection chip of the present disclosure. After interacting with microwaves, since absorption spectra of particles with different structures have different characteristics, and the detection chip is sensitive to concentration and distribution of the to-be-detected particles, the detection chip can be used to determine types of the particles and quantitatively analyze concentrations thereof. Specifically, the detection chip is not dedicated for determination of only a specific type of particles and can be reused.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a detection device and a detection method for physically determining presence of particles through microwave coupling characteristics of the particles, in which a detection chip with a novel structure is utilized. A general objective of the present disclosure is to provide a rapid detection system based on microwave resonant absorption (MRA) characteristics of the particles.

Figure 1:
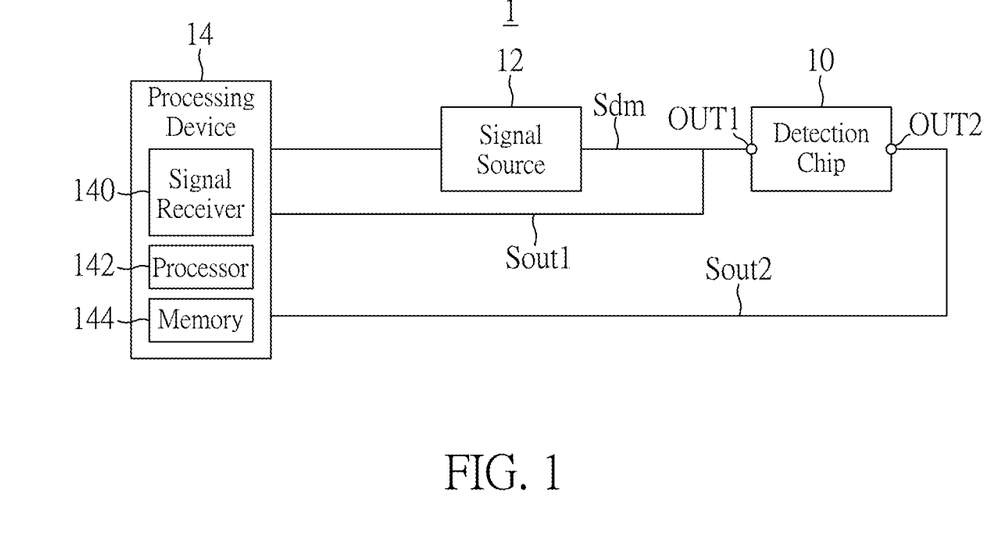
FIG. 1 is a functional block diagram of a detection device according to one embodiment of the present disclosure.
Figure 2:
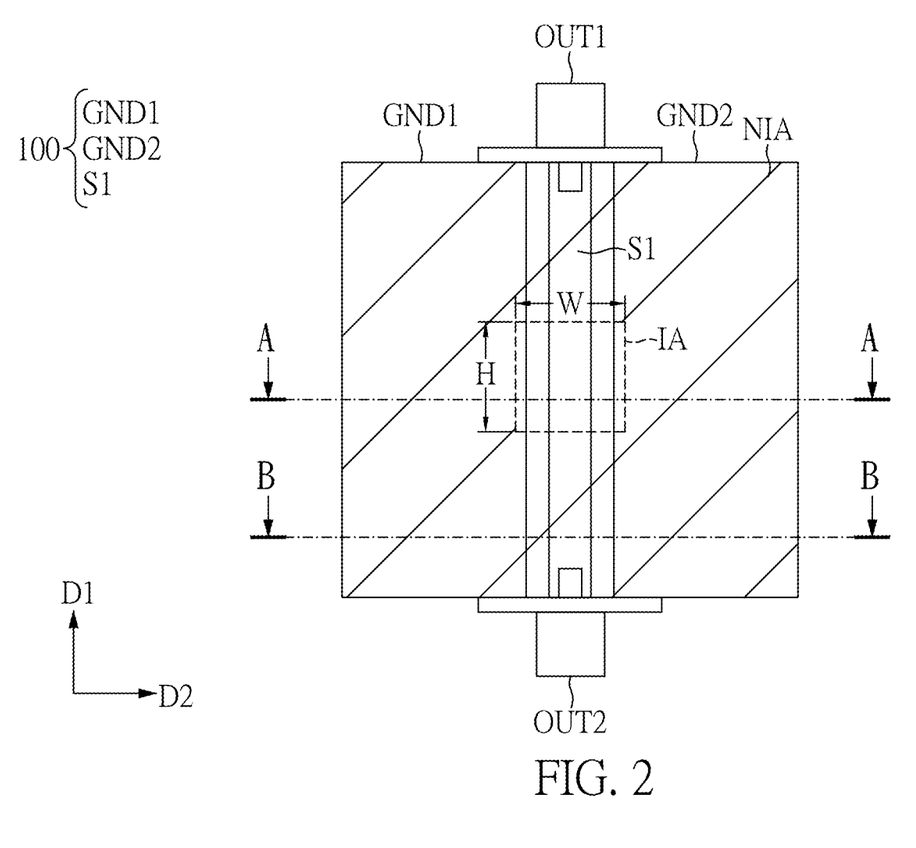
FIG. 2 is a schematic top view of a detection chip according to one embodiment of the present disclosure.
Figure 3:
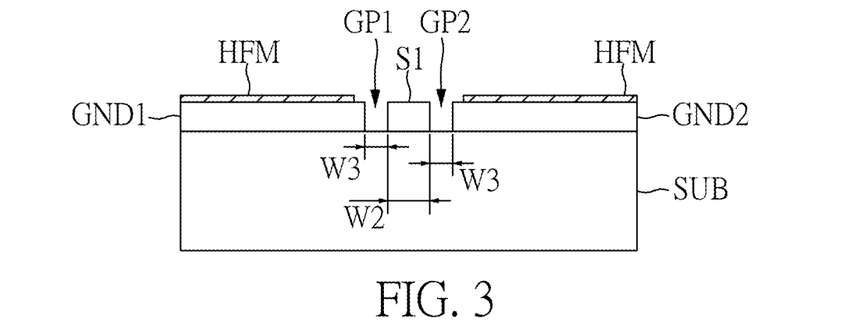
FIG. 3 is a schematic cross-sectional view taken along line A-A of FIG. 2.
Figure 4:
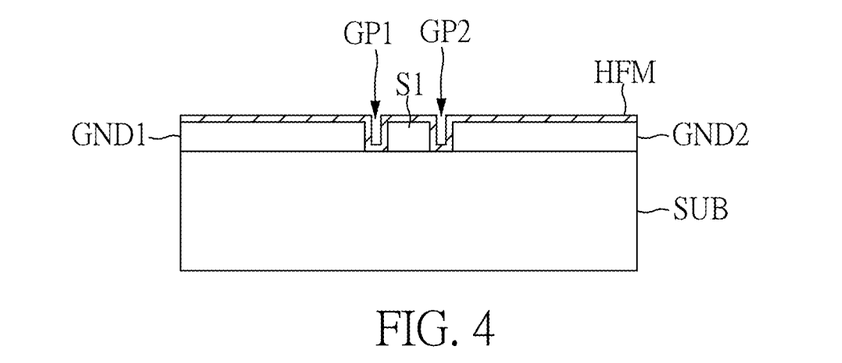
FIG. 4 is a schematic cross-sectional view taken along line B-B of FIG. 2.

FIG. 1 is a functional block diagram of a detection device according to one embodiment of the present disclosure, FIG. 2 is a schematic top view of a detection chip according to one embodiment of the present disclosure, FIG. 3 is a schematic cross-sectional view taken along line A-A of FIG. 2, and FIG. 4 is a schematic cross-sectional view taken along line B-B of FIG. 2.

Referring to FIGS. 1 to 4, one embodiment of the present disclosure provides a detection device 1 for distinguishing types of particles in an aqueous solution, and the detection device 1 includes a detection chip 10, a signal source 12 and a processing device 14.

The signal source 12 can be a microwave signal source and can be controlled to provide microwave signals having different frequencies. For example, the signal source 12 can provide a microwave signal having a frequency of GHz.

On the other hand, in order to perform an MRA spectrum measurement, the processing device 14 can include a signal receiver 140, a processor 142 and a memory 144. The signal source 12 and the processing device 14 can be implemented by a standard (40 MHz to 65 GHZ) network analyzer 140. In addition to controlling the signal source 12, the processing device 14 is also configured to record a reflection parameter $S_{11}$ and a transmission parameter $S_{21}$ of a coplanar waveguide transmission line 100 in the detection chip 10.

Further, the processing device 14 can estimate an insertion loss by using the following equation (1):

$$A(f)=|S_{11}|^2+|S_{21}|^2=1-IL \qquad \text{equation (1)}.$$

Here, A(f) is a microwave attenuation spectrum, $S_{11}$ and $S_{21}$ are respectively the reflection parameter and the transmission parameter of the coplanar waveguide transmission line 100, and IL is the insertion loss.

Next, by comparing microwave insertion loss spectra of aqueous solution samples containing to-be-detected particles and not containing the to-be-detected particles, corresponding microwave absorption spectra can be calculated, as shown in the following equation (2):

$$\text{Normalized } IL = \left[1 - \frac{A_{v+b}(f)}{A_b(f)}\right]. \qquad \text{equation (3)}$$

Here, $A_{v+b}(f)$ is the microwave attenuation spectrum of the aqueous solution sample containing the to-be-detected particles, $A_b(f)$ is the microwave attenuation spectrum of the aqueous solution sample not containing the to-be-detected particles, and the normalized insertion loss IL can represent the microwave absorption spectrum of the aqueous solution sample containing the to-be-detected particles. The to-be-detected particles can be, for example, suspended particles composed of SARS-CoV-2 virus or HCoV-229E virus.

The processing device 14 can be devices such as a desktop computer, a notebook computer, a smart phone, and a tablet computer. The memory 144 can be used to store data such as images, code, and software modules. The memory 144 can be, for example, any type of fixed-type or removable random access memory (RAM), read-only memory (ROM), flash memory, hard disk or other similar devices, integrated circuits and combinations thereof.

The processor 142 can be, for example, a central processing unit (CPU), other programmable general-purpose or special-purpose microprocessors, a digital signal processor (DSP), a programmable controller, an application specific integrated circuit (ASIC), a programmable logic device (PLD), a graphics processing unit (GPU), other similar devices or a combination of these devices. The processor 120 can execute program codes, software modules, instructions recorded in the memory 144, so as to implement the detection device and detection method provided by embodiments of the present disclosure.

In the following description, the detection chip 10 will be described first. As shown in FIG. 2 to FIG. 4, the detection chip 10 includes a substrate SUB, the coplanar waveguide transmission line 100 and a super-hydrophobic film mask HFM.

The substrate SUB can be, for example, a printed circuit board (PCB) substrate. The substrate SUB includes a glass fiber nonwoven fabric and an epoxy resin, and has a permittivity between 3.6 and 4.5. As shown in the schematic top view, the substrate SUB can have a detection area IA and a non-detection area NIA arranged around the detection area IA.

The coplanar waveguide transmission line 100 is disposed on the substrate SUB and across the detection area IA and the non-detection area NIA. The coplanar waveguide transmission line 100 includes a first ground line GND1, a second ground line GND2 and a signal line S1. For example, the first ground line GND1, the second ground line GND2 and the signal line S1 are all copper conductors, and each have a thickness of, for example, about 100 μm.

The first ground line GND1 extends along a first direction D1, and the second ground line GND2 also extends along the first direction D1 and is substantially parallel to the first ground line GND1. The signal line S1 also extends along the first direction D1, and is disposed between the first ground line GND1 and the second ground line GND2 along a second direction D2 that is perpendicular to the first direction D1. The signal line S1 has a first end OUT1 and a second end OUT2. In particular, the first ground line GND1, the second ground line GND2 and the signal line S1 are arranged to be coplanar with each other, so as to form a coplanar waveguide.

The signal source 12 can be electrically connected to the first end OUT1 of the signal line S1, and is configured to provide to the signal line S1 a detection microwave signal Sdm with a detection frequency. The processing device 14 is electrically connected to the first end OUT1, the second end OUT2 and the signal source 12. The processing device 14 is configured to control the signal source 12 to provide the detection microwave signal Sdm, and to receive a first output signal Sout1 of the first end OUT1 and a second output signal Sout 2 of the second end OUT2.

In this structure, in order to measure the insertion loss mentioned above, after the detection microwave signal Sdm is sent from the first end OUT1, two signals need to be measured. One of the two signals is a reflected signal that is reflected back to a signal sending end (that is, the first output signal Sout1), and another one of the two signals is a transmitted signal that is transmitted through the detection chip 10 (that is, the second output signal Sout2). Since measurement of the insertion loss is a dual-port and bidirectional process, the microwave signal Sdm can also be input into the second end OUT2, the second output signal Sout2 can be taken as the reflected signal, and the first output signal Sout1 can be taken as the transmitted signal. In one embodiment of the present disclosure, since the structure of the detection chip 10 is symmetrical, during actual measurement, it is only necessary to choose any one of the first end OUT1 and the second end OUT2 for inputting the detection microwave signal Sdm, and to measure response signals from the two ends.

As shown in FIG. 2, the first end OUT1 and the second end OUT2 are respectively and electrically connected to two subminiature version A (SMA) connectors, so as to be connected to the signal source 12 and the processing device 14. Further, the first ground line GND1 and the second ground line GND2 can also be grounded through the SMA connectors. The description above is only for illustration purposes, and the present disclosure is not limited thereto. In addition, a first gap GP1 is formed between the signal line S1 and the first ground line GND1, and a second gap GP2 is formed between the signal line S1 and the second ground line GND2.

Referring to FIGS. 3 and 4, the super-hydrophobic film mask HFM is disposed on the coplanar waveguide transmission line 100 and the substrate SUB, so as to cover the non-detection area NIA without covering the detection area IA.

The super-hydrophobic thin film mask HFM has a first thickness T1, which ranges from 5 nm to 15 nm. It should be noted that the super-hydrophobic film mask HFM is non-conductive and has a first permittivity, and the first permittivity is within a predetermined range based on a permittivity of air. For example, the first permittivity can be less than 1.4.

For example, a hydrophobic self-assembled monolayer film mask can be used as the super-hydrophobic film mask HFM, and can be made of, for example, Octadecyltrichlorosilane (OTS). The advantage of using the above-mentioned material is that a manufacturing process is simple, and the selected material has a permittivity close to that of air. Therefore, for microwave signals, since a refractive index of the self-assembled super-hydrophobic film mask is similar to that of air, and the self-assembled super-hydrophobic film mask is a non-conductor and has a thickness that is much smaller than a microwave wavelength, a bandwidth and an impedance of the detection chip 10 will not be affected.

A self-assembled hydrophobic nano-scale monolayer can be produced by a spin coating process. The detection area IA of the coplanar waveguide transmission line 100 is firstly covered with a rubber cube, and the self-assembled hydrophobic nano-scale monolayer can be easily synthesized on an area outside the rubber cube, so as to create a rectangular area with less hydrophobicity. In this way, the non-detection area NIA with high hydrophobicity and the detection area IA with low hydrophobicity can be defined.

Figure 5:
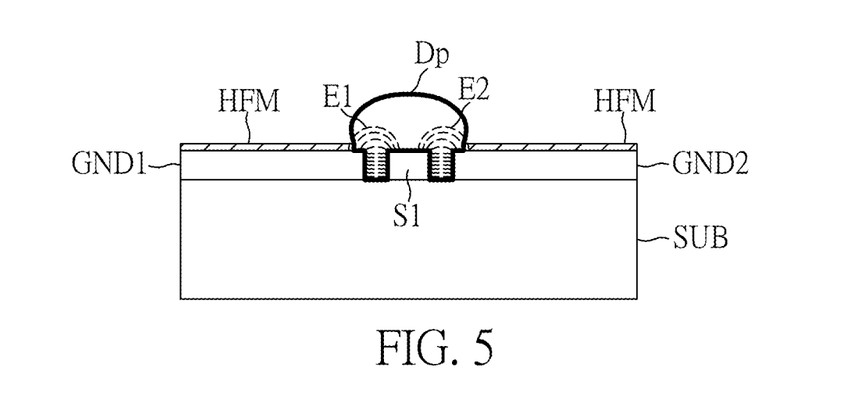
FIG. 5 is a schematic diagram showing outward-extended electric fields generated by a coplanar waveguide transmission line according to one embodiment of the present disclosure.

Reference is made to FIG. 5, which is a schematic diagram showing outward-extended electric fields generated by a coplanar waveguide transmission line according to one embodiment of the present disclosure. As shown in FIG. 5, in response to the signal source 12 providing the detection microwave signal Sdm to the first end OUT1, a first electric field E1 is formed between the signal line S1 and the first ground line GND1, and a second electric field E2 is formed between the signal line S1 and the second ground line GND2. The detection area IA can be, for example, a rectangle, but is not limited thereto. In order to match the first electric field E1 and the second electric field E2, the detection area IA can be symmetrical with respect to the second direction D2. For example, the detection area IA can be a circle or other polygons. When the detection area IA is a rectangle, a first length H is defined in the first direction D1 and a first width W is defined in the second direction D2.

On the other hand, when the to-be-detected aqueous solution is dropped on a surface of the detection chip 10, a droplet Dp can be confined in the detection area IA with low hydrophobicity, and a boundary of the droplet Dp can be well controlled. In order to ensure that the to-be-detected aqueous solution can be completely and consistently detected, the first width W needs to be accurately designed. According to relevant simulation results, a correlation is established between the first width W and a maximum electric field intensity of the first electric field E1 or the second electric field E2.

Figure 6:
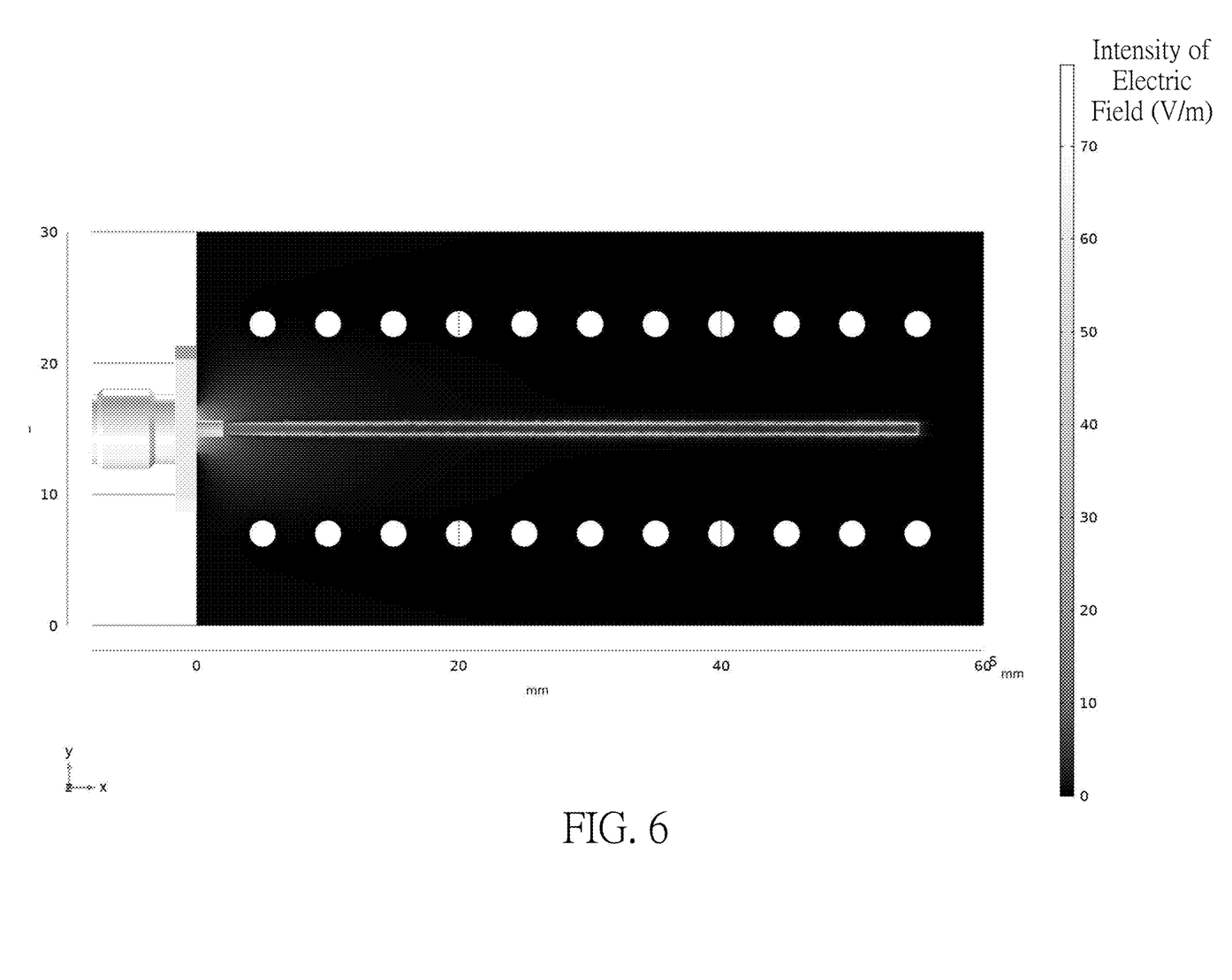
FIGS. 6 and 7 are respectively a top-view distribution diagram and a cross-sectional distribution diagram showing intensities of simulated electric fields of the coplanar waveguide transmission line with narrow gaps according to one embodiment of the present disclosure.
Figure 7:
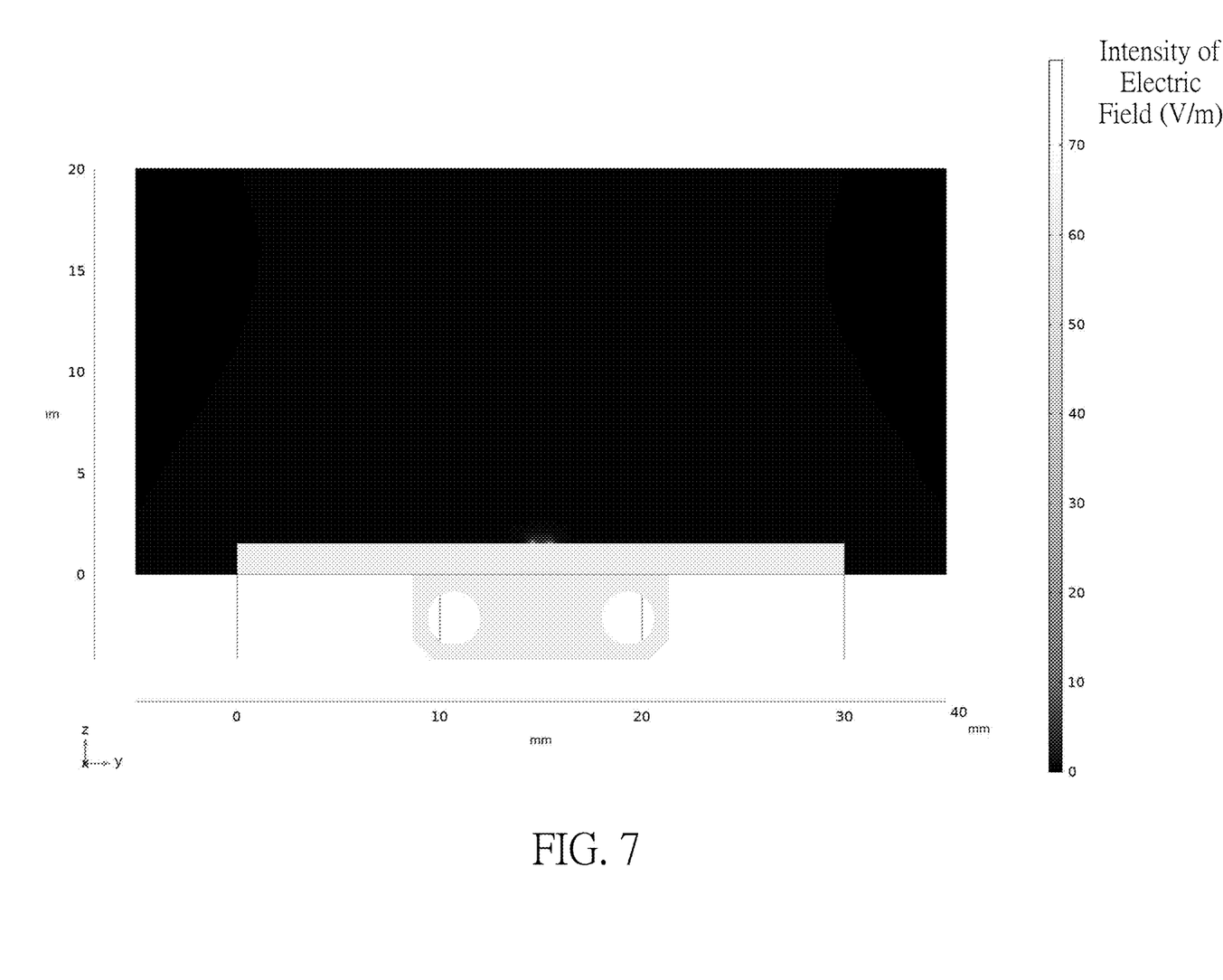

Reference is made to FIGS. 6 and 7, which are respectively a top-view distribution diagram and a cross-sectional distribution diagram showing intensities of simulated electric fields of the coplanar waveguide transmission line according to one embodiment of the present disclosure. In order to design a size of the detection area IA, a finite-difference time-domain (FDTD) method is utilized to simulate an electric field distribution of the coplanar waveguide transmission line 100. As shown in FIGS. 6 and 7, it can be seen that outward-extended electric fields are bent outside a plane between the signal line S1 and the first ground line GND1 (or the second ground line GND2). Therefore, the first width W can be designed at a position that the electric field intensity drops to 5% of the maximum electric field intensity, such that a sufficiently strong electric field can be ensured to pass through the droplet of the to-be-detected aqueous solution, thereby completely and consistently detecting the to-be-detected particles in the to-be-detected aqueous solution. In addition, according to the electric field distribution diagram, since the detection chip 10 with the coplanar waveguide transmission line 100 is utilized, significant energy coupling and transfer can occur between outward-extended microwave electric fields and the to-bedetected particles in the to-be-detected aqueous solution, such that the microwave absorption spectrum can be directly measured.

In some embodiments, the detection area IA may be a square, and the first width W can be set to be the same as the first length H. In addition, a position of the detection area IA can be, for example, located in the middle of the coplanar waveguide transmission line 100. However, the present embodiment is only an example, and the present disclosure is not limited thereto. It should be noted that a coordinate axis x corresponds to the first direction D1, a coordinate axis y corresponds to the second direction D2 (but in an opposite direction), and a coordinate axis z is perpendicular to the coordinate axes x and y, as shown in FIGS. 6 and 7.

After the size of the detection area IA is determined, a size of the coplanar waveguide transmission line 100 needs to be further designed. In this embodiment, the signal line S1 is a microstrip line and has a second width W2 in the second direction D2. The second width W2 ranges from 1.8 to 2.4 mm.

Based on the above-mentioned second width W2, widths of the first gap GP1 and the second gap GP2 are further designed. In a symmetrical structure, the first gap GP1 and the second gap GP2 have the same width (e.g., a third width W3). For example, in FIGS. 6 and 7, the third width W3 (which is narrower and about 0.05 mm) is adopted.

In detail, coplanar waveguides are well known waveguides in microwave applications, and various pieces of software are known for designing the coplanar waveguides. For a given frequency bandwidth, an optimized structure provided by the present disclosure is not unique. However, for the same input power, bending amplitude and profile of the electric field on the coplanar waveguide depend on a gap distance between the signal line S1 and the first ground line GND1 (or the second ground line GND2). It should be understood that the smaller an effective detection area is, the lower the sensitivity is. Therefore, optimization of the widths of the first gap GP1 and the second gap GP2 is further required.

Figure 8:
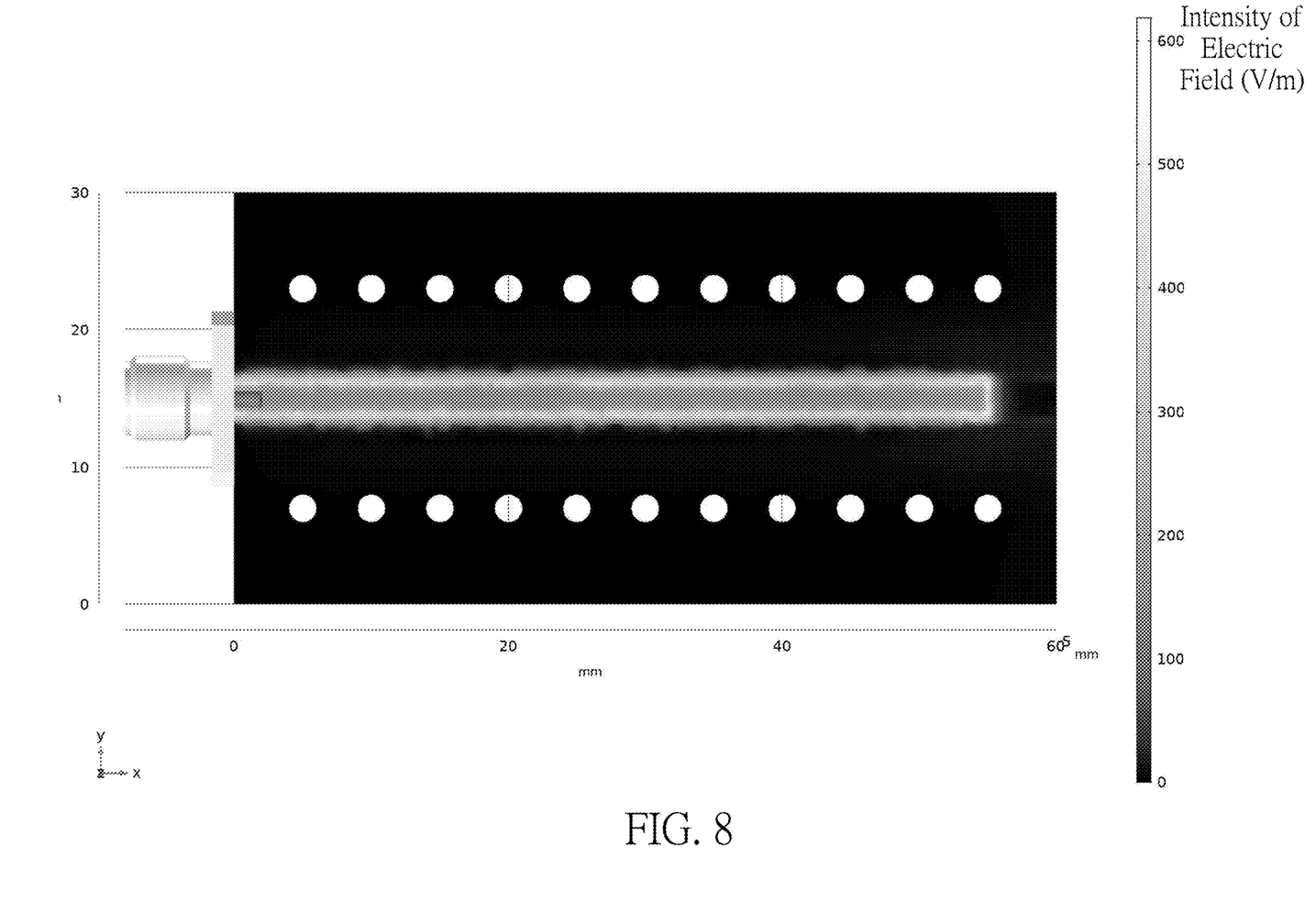
FIGS. 8 and 9 are respectively a top-view distribution diagram and a cross-sectional distribution diagram showing intensities of simulated electric fields of a coplanar waveguide transmission line with wide gaps according to one embodiment of the present disclosure.
Figure 9:
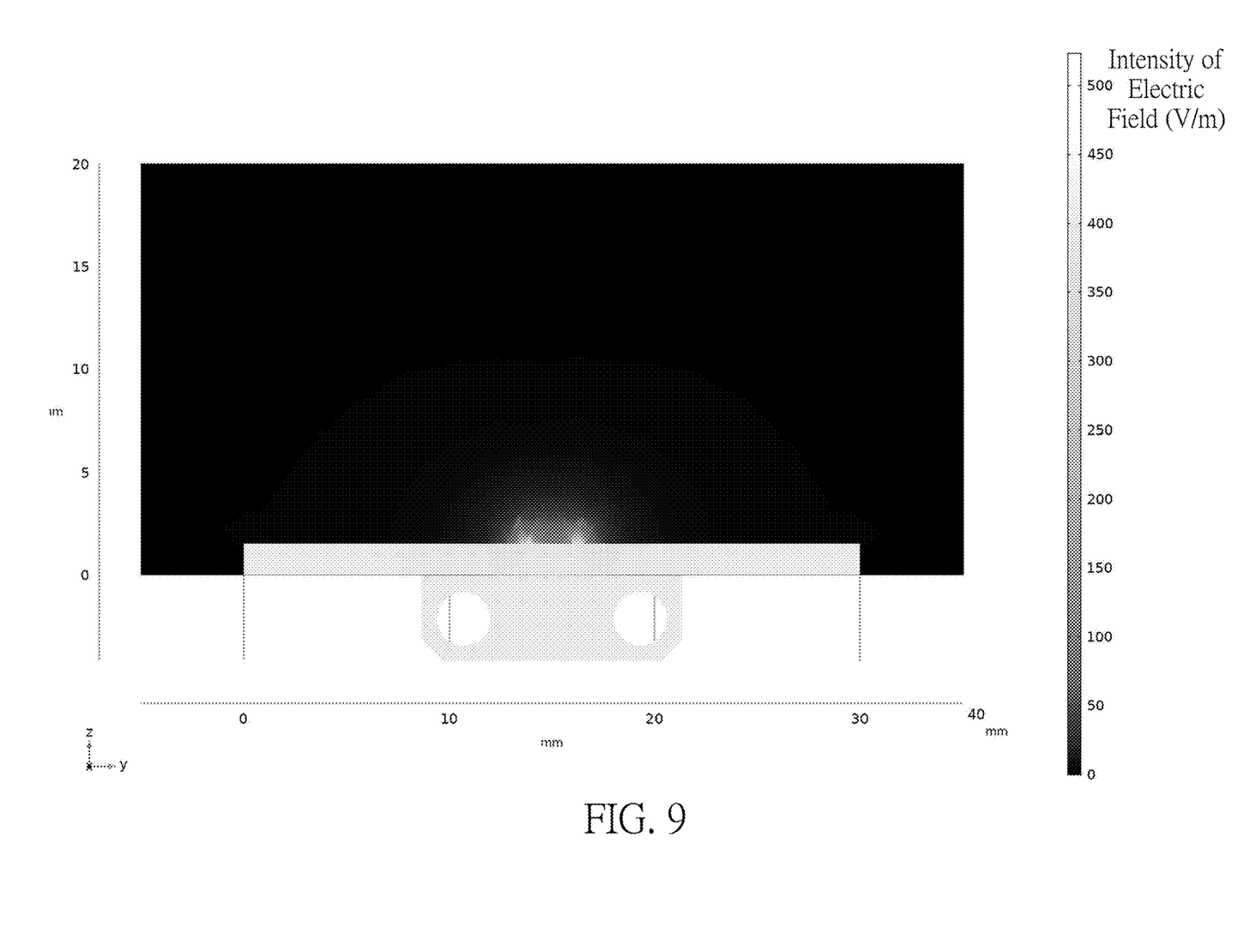

Reference is made to FIGS. 8 and 9, which are respectively a top-view distribution diagram and a cross-sectional distribution diagram showing intensities of simulated electric fields of a coplanar waveguide transmission line using wide gaps according to one embodiment of the present disclosure. For narrower gaps (approximately 0.05 mm), the electric field is obviously narrower when compared to wider gaps (approximately in a range from 0.45 mm to 0.65 mm), which may result in insufficient spatial coverage of the electric field and cause the measured microwave signal intensity to be less than noises of the detection system. However, when the wide gap is used, the spatial coverage of the outward-extended electric field obviously becomes larger and a sufficient outward-extending range of the electric field can thus be provided, thereby ensuring high efficiency for interactions between the electric field and the droplet of the to-be-detected aqueous solution. Accordingly, the signal intensity can be greater than the noises.

Figure 10:
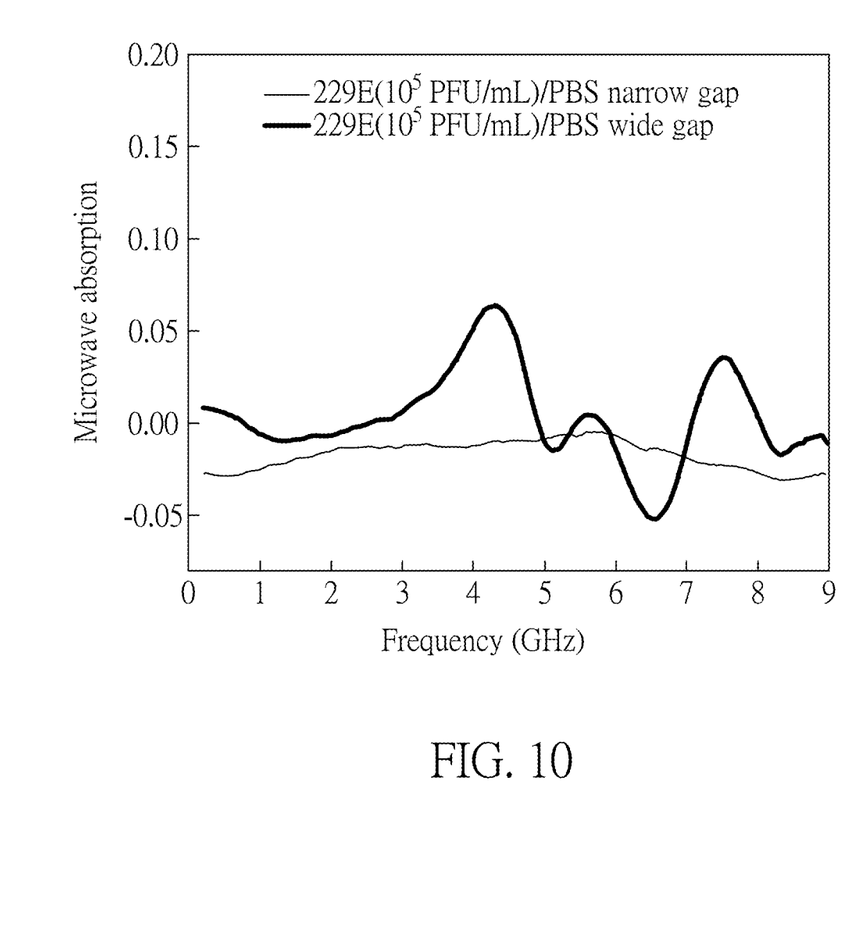
FIG. 10 shows microwave absorption spectra of coronaviruses detected by respectively using the coplanar waveguide transmission line with the wide gaps and a coplanar waveguide transmission line with narrow gaps.

In this case, reference can be further made to FIG. 10, which shows microwave absorption spectra of coronaviruses detected by respectively using the coplanar waveguide transmission lines with wide gaps and a coplanar waveguide transmission line with narrow gaps. In FIG. 10, coronavirus 229E is taken as a particle sample. A minimum virus titer/concentration and a virus sample volume used are $10^5$ PFU/mL and 40 uL. A guaranteed number of particles in a single test can be calculated to be 4000.

As shown in FIG. 10, when the coplanar waveguide transmission line 100 with the wide gap is used, there are obvious absorption peaks under different frequencies. However, when the coplanar waveguide transmission line 100 with the narrow gap is used, the absorption peak can hardly be observed. Therefore, in one exemplary embodiment of the present disclosure, the third width W3 ranges from 0.45 mm to 0.65 mm.

For MRA spectral measurements, these viruses are cultured, isolated, purified, and then stored in a phosphate-buffered saline (PBS) buffer solution. In each measurement, a micropipette is used to take out, for example, 40 microliters of a virus solution. Then, the virus solution is dropped onto the detection area IA. The droplet of the to-be-detected aqueous solution is confined in the detection area IA by the non-detection area NIA with high hydrophobicity. At the same time, the guided microwaves can be introduced into the droplet of the to-be-detected aqueous solution containing the virus. In one embodiment of the present disclosure, the measured microwave absorption spectrum is derived from an average value of all participating particles. Since different particles exhibit different frequency spectra, deconvolution methods can be used to separate the participating particles.

Figure 11:
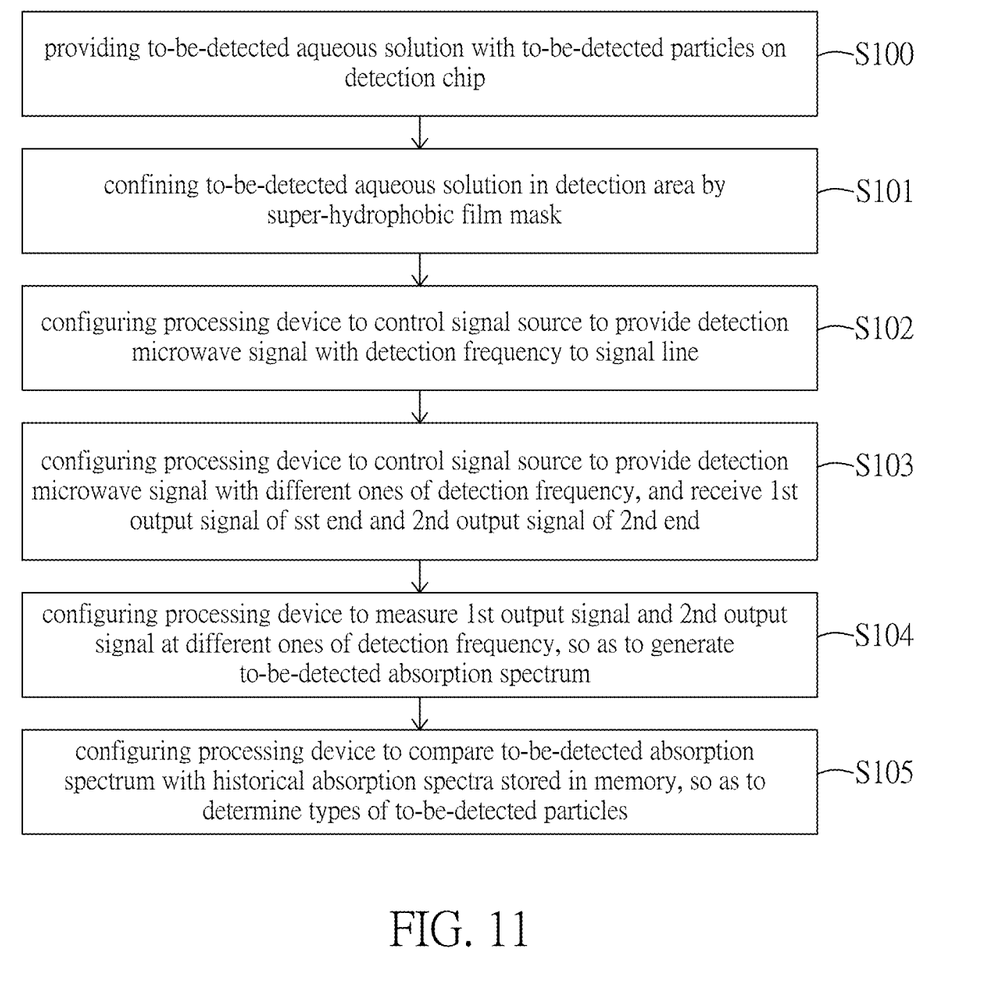
FIG. 11 is a flowchart of a detection method for distinguishing types of particles in an aqueous solution according to one embodiment of the present disclosure.

Reference is made to FIG. 11, which is a flowchart of a detection method for distinguishing types of particles in an aqueous solution according to one embodiment of the present disclosure. The detection method is applicable to the above-mentioned detection device, but is not limited thereto. The detection method includes the following steps.

Step S100: providing a to-be-detected aqueous solution with to-be-detected particles on a detection chip.

Step S101: confining the to-be-detected aqueous solution in the detection area by the super-hydrophobic film mask.

Step S102: configuring a processing device to control a signal source to provide a detection microwave signal with a detection frequency to the signal line.

Step S103: configuring the processing device to control the signal source to provide the detection microwave signal with different ones of the detection frequency, and receive a first output signal of the first end and a second output signal of the second end.

Step S104: configuring the processing device to measure the first output signal and the second output signal at the different ones of the detection frequency, so as to generate a to-be-detected absorption spectrum. In detail, in this step, the to-be-detected aqueous solution with the to-be-detected particles can be taken as an experimental group, and the aqueous solution that does not contain the to-be-detected particles can be taken as a control group. Insertion losses of the experimental group and the control group are respectively measured, and the two are compared to obtain the MRA spectrum (which is taken as the to-be-detected absorption spectrum). For example, the detection frequency can range from 0.1 GHz to 9 GHz.

Step S105: configuring the processing device to compare the to-be-detected absorption spectrum with a plurality of historical absorption spectra stored in a memory, so as to determine types of the to-be-detected particles. In detail, the plurality of historical absorption spectra can be generated by using the detection device provided by the present disclosure to measure absorption spectra of known sample aqueous solutions in advance, and a user can select various sample aqueous solutions to establish the plurality of historical absorption spectra that correspond to various particles.

The microwave absorption spectrum of the to-be-detected particles can be obtained within a negligible time (<1 sec) after the to-be-detected particles are dropped onto the detection chip of the present disclosure. Since absorption spectra of particles with different structures have different characteristics, and the detection chip is sensitive to concentration and distribution of the to-be-detected particles, the detection chip can be used to determine types of the particles and quantitatively analyze concentrations thereof. Specifically, the detection chip is not dedicated for determination of only a specific type of particles and can be reused.

Beneficial Effects of the Embodiments

In conclusion, in the detection device and the detection method for distinguishing types of particles in an aqueous solution provided by the present disclosure, the detection chip with a coplanar waveguide is utilized, such that significant energy coupling and transferring occur between outward-extended microwave electric fields and the to-be-detected particles in the to-be-detected aqueous solution. In this way, the microwave absorption spectrum can be directly measured.

In addition, the self-assembled super-hydrophobic film mask on the detection chip can effectively confine the to-be-detected aqueous solution to a specific area. Therefore, except for microwave absorption generated by the particles, no additional measurement difference is produced between the control group and the experimental group. Furthermore, since a refractive index of the self-assembled super-hydrophobic film mask is similar to that of air, and the self-assembled super-hydrophobic film mask is a non-conductor, a bandwidth and an impedance of the detection chip will not be affected.

Moreover, the microwave absorption spectrum of the particles in the aqueous solution can be obtained within a negligible time (<1 sec) after the aqueous solution is dropped onto the detection chip of the present disclosure. After interacting with microwaves, since absorption spectra of particles with different structures have different characteristics, and the detection chip is sensitive to concentration and distribution of the to-be-detected particles, the detection chip can be used to determine types of the particles and quantitatively analyze their concentrations thereof. Specifically, the detection chip is not dedicated for determination of only a specific type of particle and can be reused.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detection device for distinguishing types of particles in an aqueous solution, the detection device comprising:
   a detection chip, which includes:
      a substrate, wherein a detection area and a non-detection area arranged around the detection area are defined on an upper surface of the substrate;
      a coplanar waveguide transmission line disposed on the substrate and across the detection area and the non-detection area, wherein the coplanar waveguide transmission line includes:
         a first ground line extending along a first direction;
         a second ground line extending along the first direction, wherein the second ground line is parallel to the first ground line in a first view, and the first ground line and the second ground line are arranged to be coplanar with each other in a second view; and
         a signal line extending along the first direction and disposed between the first ground line and the second ground line along a second direction that is perpendicular to the first direction, wherein the signal line has a first end and a second end; wherein the signal line, the first ground line and the second ground line are coplanar, a first gap is provided between the signal line and the first ground line, and a second gap is provided between the signal line and the second ground line; and
      a hydrophobic film mask disposed on the coplanar waveguide transmission line and the substrate, so as to cover the non-detection area without covering the detection area;
   a signal source electrically connected to the first end of the signal line, wherein the signal source is configured to provide a detection signal with a detection frequency to the signal line, wherein the detection frequency ranges from 0.1 GHz to 9 GHz; and
   a processing device electrically connected to the first end, the second end and the signal source, wherein the processing device is configured to control the signal source to provide the detection signal, and to receive a first output signal of the first end and a second output signal of the second end;
   wherein, in response to a to-be-detected aqueous solution that contains to-be-detected particles being provided on the detection chip, the hydrophobic film mask is configured to confine the to-be-detected aqueous solution in the detection area, and the processing device is configured to control the signal source to provide the detection signal with different ones of the detection frequency and to simultaneously measure the first output signal and the second output signal at the different ones of the detection frequency, so as to generate a to-be-detected absorption spectrum;
   wherein, in response to the processing device generating the to-be-detected absorption spectrum, the processing device is further configured to compare the to-be-detected absorption spectrum with a plurality of historical absorption spectra stored in a memory, so as to determine types of the to-be-detected particles.

2. The detection device according to claim 1, wherein the detection area is a rectangle having a first length in the first direction and a first width in the second direction.

3. The detection device according to claim 2, wherein, in response to the signal source providing the detection signal to the first end, a first electric field is formed between the signal line and the first ground line, a second electric field is formed between the signal line and the second ground line, and the first width is related to a maximum electric field intensity of the first electric field or the second electric field.

4. The detection device according to claim 1, wherein the super-hydrophobic film mask has a first thickness, and the first thickness ranges from 5 nm to 15 nm.

5. The detection device according to claim 1, wherein the super-hydrophobic film mask is non-conductive and has a first permittivity, and the first permittivity is within a predetermined range based on a permittivity of air.

6. The detection device according to claim 5, wherein the first permittivity is less than 1.4.

7. The detection device according to claim 5, wherein the super-hydrophobic film mask is a hydrophobic self-assembled monolayer film mask.

8. The detection device according to claim 7, wherein the hydrophobic self-assembled monolayer film mask is made of octadecyltrichlorosilane (OTS).

9. The detection device according to claim 2, wherein the signal line is a microstrip line and has a second width in the second direction, and the second width ranges from 1.8 mm to 2.4 mm.

10. The detection device according to claim 1, wherein the first gap and the second gap are equal to each other, and the first gap and the second gap each have a third width ranging from 0.45 mm to 0.65 mm.

11. A detection method for distinguishing types of particles in an aqueous solution, the detection method comprising:
providing a to-be-detected aqueous solution that contains to-be-detected particles on a detection chip, wherein the detection chip includes:
a substrate, wherein a detection area and a non-detection area arranged around the detection area are defined on an upper surface of the substrate;
a coplanar waveguide transmission line disposed on the substrate and across the detection area and the non-detection area, wherein the coplanar waveguide transmission line includes:
a first ground line extending along a first direction;
a second ground line extending along the first direction, wherein the second ground line is parallel to the first ground line in a first view, and the first ground line and the second ground line are arranged to be coplanar with each other in a second view; and
a signal line extending along the first direction and disposed between the first ground line and the second ground line along a second direction that is perpendicular to the first direction, wherein the signal line has a first end and a second end; wherein the signal line, the first ground line and the second ground line are coplanar, a first gap is provided between the signal line and the first ground line, and a second gap is provided between the signal line and the second ground line; and
a hydrophobic film mask disposed on the coplanar waveguide transmission line and the substrate, so as to cover the non-detection area without covering the detection area;
confining the to-be-detected aqueous solution in the detection area by the super-hydrophobic film mask;
configuring a processing device to control a signal source to provide a detection signal with a detection frequency to the signal line, wherein the detection frequency ranges from 0.1 GHz to 9 GHz;
configuring the processing device to control the signal source to provide the detection signal with different ones of the detection frequency and to receive a first output signal of the first end and a second output signal of the second end;
configuring the processing device to measure the first output signal and the second output signal at the different ones of the detection frequency, so as to generate a to-be-detected absorption spectrum; and
configuring the processing device to compare the to-be-detected absorption spectrum with a plurality of historical absorption spectra stored in a memory, so as to determine types of the to-be-detected particles.

12. The detection method according to claim 11, wherein the detection area is a rectangle having a first length in the first direction and a first width in the second direction.

13. The detection method according to claim 12, wherein, in response to the signal source providing the detection signal to the first end, a first electric field is formed between the signal line and the first ground line, a second electric field is formed between the signal line and the second ground line, and the first width is related to a maximum electric field intensity of the first electric field or the second electric field.

14. The detection method according to claim 11, wherein the super-hydrophobic film mask has a first thickness, and the first thickness ranges from 5 nm to 15 nm.

15. The detection method according to claim 11, wherein the super-hydrophobic film mask is non-conductive and has a first permittivity, and the first permittivity is within a predetermined range based on a permittivity of air.

16. The detection method according to claim 15, wherein the first permittivity is less than 1.4.

17. The detection method according to claim 15, wherein the super-hydrophobic film mask is a hydrophobic self-assembled monolayer film mask.

18. The detection method according to claim 17, wherein the hydrophobic self-assembled monolayer film mask is made of octadecyltrichlorosilane (OTS).

19. The detection method according to claim 12, wherein the signal line is a microstrip line, and has a second width in the second direction, and the second width ranges from 1.8 mm to 2.4 mm.

20. The detection method according to claim 11, wherein the first gap and the second gap are equal to each other, and the first gap and the second gap each have a third width ranging from 0.45 mm to 0.65 mm.

* * * * *